(12) United States Patent
Du Breuil

(10) Patent No.: US 7,705,874 B2
(45) Date of Patent: Apr. 27, 2010

(54) LIGHTING FOR VIDEO SYSTEMS

(75) Inventor: Thomas L. Du Breuil, Ivyland, PA (US)

(73) Assignee: General Instrument Corporation, Horsham, PA (US)

( * ) Notice: Subject to any disclaimer, the term of this patent is extended or adjusted under 35 U.S.C. 154(b) by 1161 days.

(21) Appl. No.: 11/313,981

(22) Filed: Dec. 21, 2005

(65) Prior Publication Data

US 2007/0139515 A1 Jun. 21, 2007

(51) Int. Cl.
*H04N 7/14* (2006.01)
(52) U.S. Cl. .................................. 348/14.01
(58) Field of Classification Search ............ 348/14.01, 348/14.02
See application file for complete search history.

(56) References Cited

U.S. PATENT DOCUMENTS

| | | | | |
|---|---|---|---|---|
| 3,816,654 A | * | 6/1974 | Brightman | 348/156 |
| 5,001,552 A | * | 3/1991 | Okino | 348/224.1 |
| 6,924,843 B1 | * | 8/2005 | Yamazaki et al. | 348/423.1 |
| 7,394,538 B2 | * | 7/2008 | Bazin | 356/364 |
| 2006/0082676 A1 | * | 4/2006 | Jenkins et al. | 348/362 |
| 2006/0135224 A1 | * | 6/2006 | Patino et al. | 455/575.3 |
| 2007/0002130 A1 | * | 1/2007 | Hartkop | 348/14.16 |

* cited by examiner

Primary Examiner—Stella L Woo

(57) ABSTRACT

A video system and method of operation are described that compensate for low-light conditions. The video system includes a light source that adjusts. In one example the light source is controlled to either shine more light upon the user's face or less dependent upon the ambient conditions. In another example, the color of the light is changed to improve image quality. The light source may also be directly or indirectly controlled by a switch mounted onto the video telephone. Various configurations of light sources may also be implemented into the video system.

6 Claims, 7 Drawing Sheets

300

LIGHTING FOR VIDEO SYSTEMS

BACKGROUND

Video telephones provide for a highly interactive communication experience. People can now hear and speak to each other along with seeing the facial expressions that are an important part of human communications.

One problem with video processing devices, including video telephones, is the proper lighting of the user's face. Due to the image processing at both the transmitter and receiver ends, poor lighting conditions at the transmission side can result in the user's face being heavily shadowed and distorted at the receiver side. In addition, under poor lighting conditions, image sensors tend to be noisy, and this added noise in the signal degrades the quality of the video encoding for a given bit rate, further degrading the overall video telephony experience.

DETAILED DESCRIPTION OF THE DRAWINGS

Figure 1:
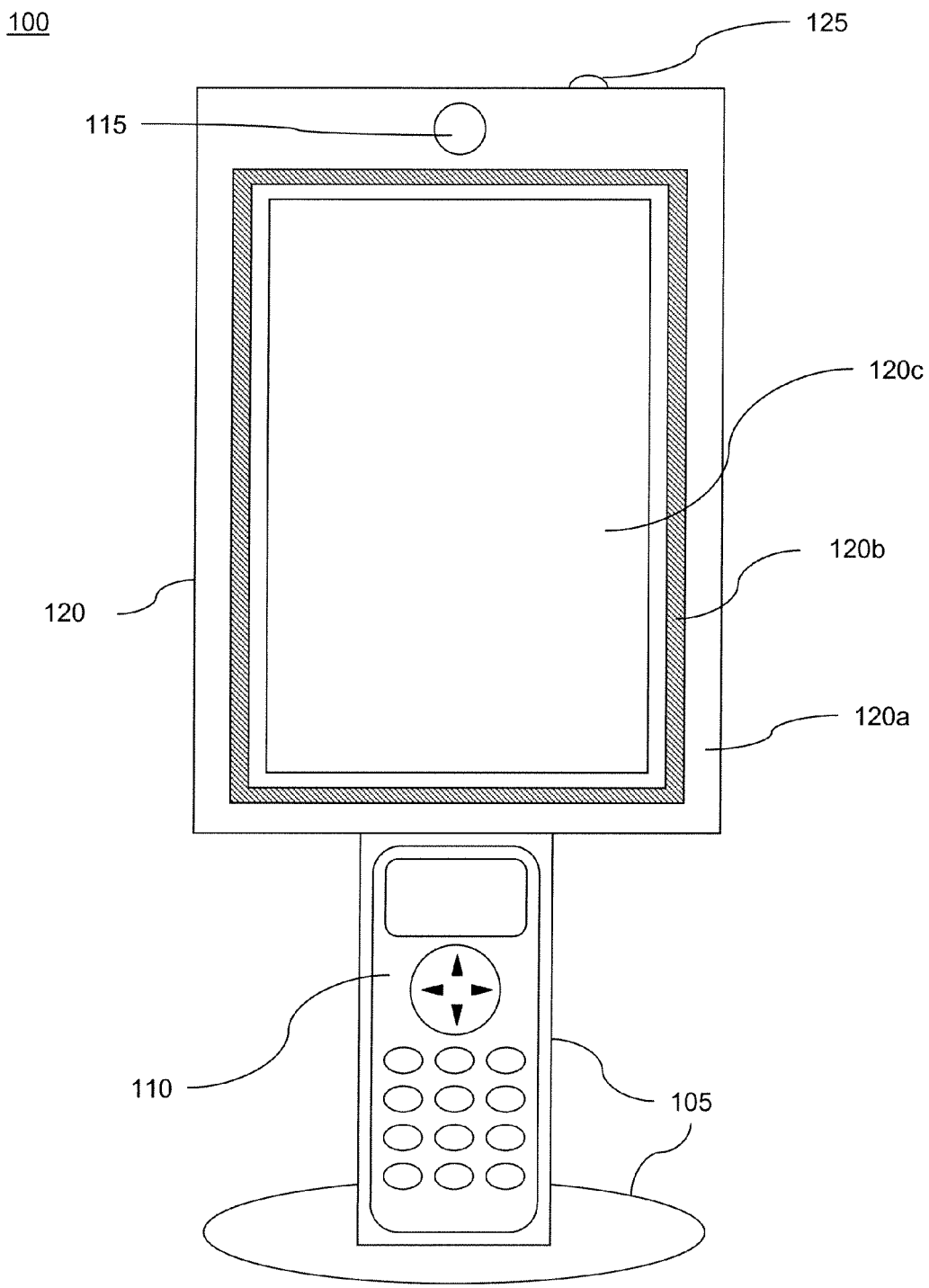
FIG. 1 is a video telephone with a light source.

FIG. 1 shows a video telephone 100. Video telephone 100 includes a base 105. Base 105 supports a cordless handset 110. Cordless handset 110 includes a microphone, a speaker and a keypad all used in standard telephony applications. Base 105 also supports a screen assembly 120. Screen assembly 120 includes a housing 120a. Housing 120a is coupled to base 105 and provides support for additional elements. In one illustrative system housing 120a made of plastic.

Mounted into housing 120a is a video camera 115. Video camera 115 captures images of the speaker for transmission to another video telephone. Housing 120a also holds light source 120b and screen 120c and, optionally, supports switch 125. In the video telephone 100 shown in FIG. 1, light source 120b circumscribes screen 120c. In one illustrative system screen 120c is an LCD screen.

Video telephone 100 operates as follows. A video telephone call is established. The user's voice is captured by a microphone and his image is captured by video camera 115. These analog signals are digitized, encoded, compressed and transmitted to another video telephone 100. At the receiver video telephone 100 the user's voice and image are received, decompressed, decoded and provided via a speaker and screen 120c. If the user's face is not properly lit, the image displayed at the receiver video telephone 100 will be dark and distorted, especially in the shadow areas of faces including the eyes, under the nose and under the chin. To increase the quality of the displayed image, light source 120b is used.

Light source 120b can be turned-on and adjusted in intensity by switch 125. In alternative systems, light source 120b is controlled automatically as will be described later. When light source 120b is turned-on, the amount of light reflecting off of the user and into video camera 115 increases thereby improving the video camera image sensing. This increased light improves the image quality at receiver video telephone 100 and yields a more pleasing video telephony experience by providing more visual detail as well as improved visibility of the sender's eyes and facial expressions. Switch 125 is shown as a dial in FIG. 1 and is an optional feature. The user changes the brightness of light 120b by turning the dial. In other words, by turning the dial in one direction, light source 120b emits more light. Turning the dial in the opposite direction causes light source 120b to emit less light.

An alternative system may include a light sensor that automatically adjusts the illumination level for optimal results taking into consideration both the ambient lighting conditions as well as the skin tone of the subject.

Light source 120b is shown in FIG. 1 to be a single, substantially contiguous element that circumscribes screen 120c. Variations to FIG. 1 include using two or more separate lighting elements to form light source 120b.

In one implementation of video telephone 100, light source 120b is recessed into housing 120a so that it is behind screen 120c and camera 115. By recessing light 120c, light is not projected onto screen 120c so it does not reflect off of the screen and cause the image to be drowned out. This could particularly happen around the edges of screen 120c. In addition, recessed light 120c does not shine light directly into camera 115 distorting the image being captured by camera 115. Clips or a friction fit may be used to mount light source 120b into housing 120a.

Figure 2:
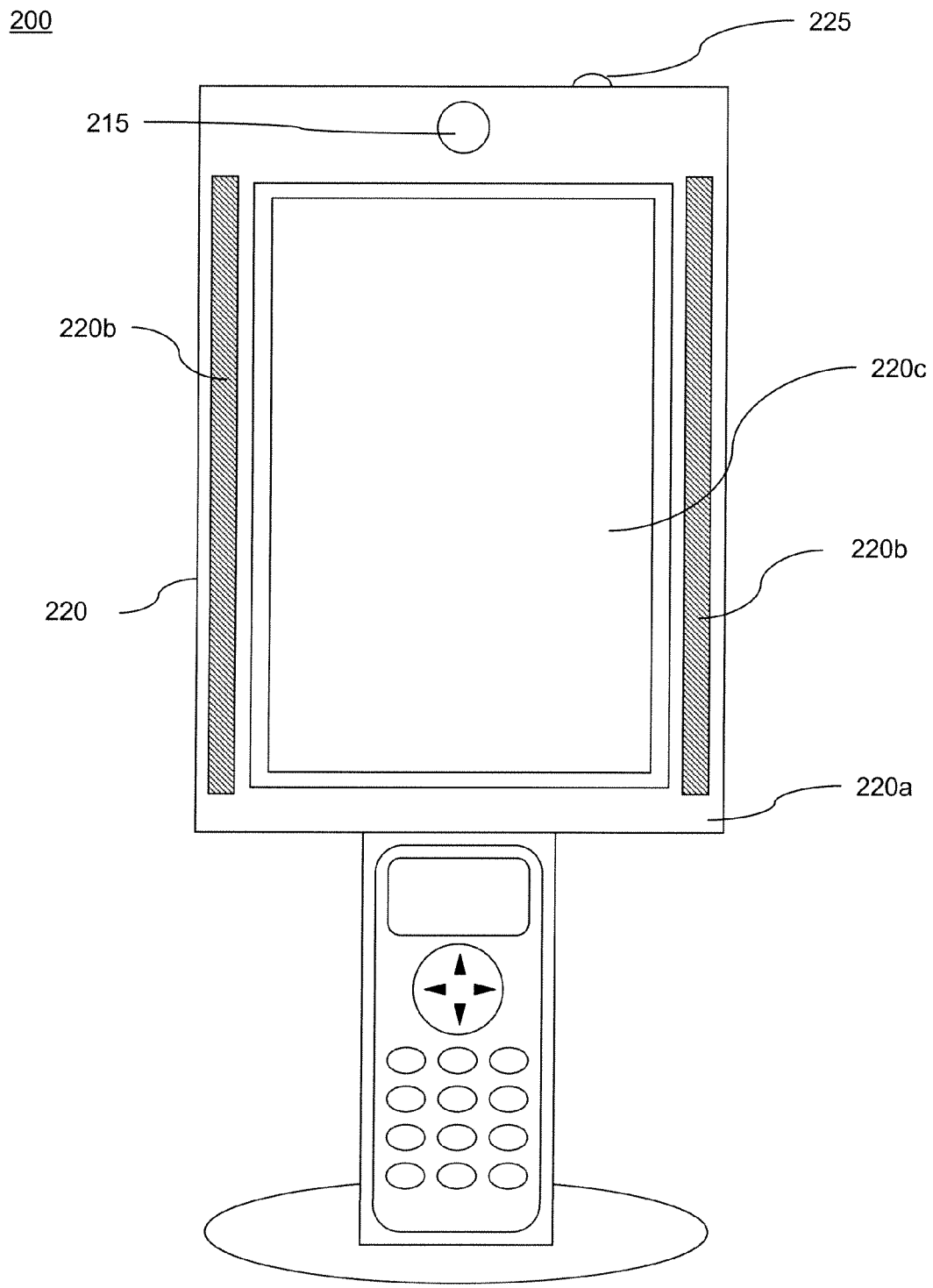
FIG. 2 is a video telephone with an alternative light source.

FIG. 2 shows an alternative video telephone 200. Video telephone 200 is similar to video telephone 100 except in the design of the screen assembly 220. Screen assembly 220 includes a housing 220a. Housing 220a supports light source 220b and screen 220c and switch 225.

Light source 220b differs from light source 120b of FIG. 1 in that it includes two discrete light elements that do not circumscribe screen 220c. The two elements of light source 220b are placed parallel to the vertical edges of screen 220c. In alternative arrangement the two light sources could be placed parallel to the horizontal edges of screen 220c. The vertical placement shown in FIG. 2 has the advantage of shining less light into or near camera 215. Light source 220b may also be recessed into housing 220a so as not to shine light directly into camera 215 or screen 220c.

Figure 3:
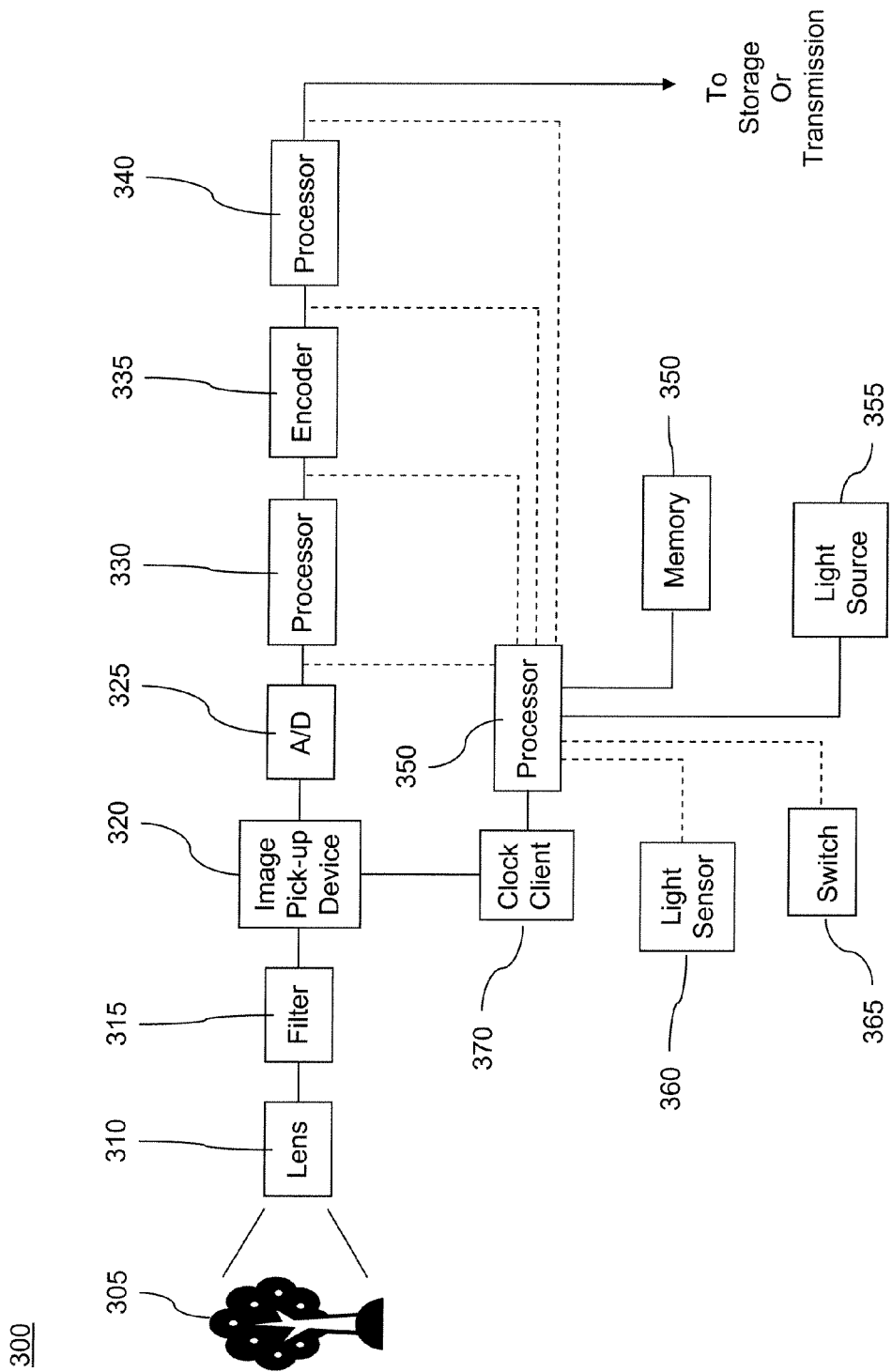
FIG. 3 is a block diagram of functional elements of a video telephone.

FIG. 3 is a diagram of an exemplary video system 300 used in a video telephone. In one illustrative system, video system 300 is integrated into camera 115 or 215. In other illustrative systems portions of video system 300 are integrated into cameras 115 and 215 while other portions are integrated into screen assemblies 120 and 220 or base 105.

An image of object 305 is to be captured. Lens 310 focuses the light reflecting from object 305 through one or more filters 315. Filters 315 remove unwanted characteristics of the light. Alternatively, multiple filters 315 may be used in color imaging. The filtered light is then shown upon image pick-up device 320. In one exemplary image pick-up device the light is shown upon a CCD or CMOS image sensor. The charges associated with each individual pixel are then sent to analog-to-digital (A/D) converter 325. A/D converter 325 generates digitized pixel data from the analog pixel data received from image pick-up device 320. The digitized pixel data is then forwarded to processor 330. Processor 330 performs operations such as white balancing, color correction or may break the data into luminance and chrominance data. White balancing and color correction are important attributes that can be easily controlled with an integrated light source that can be tuned or adjusted to provide a more pleasing "warm" color balance of the subject. This can be done by control/selection of the color temperature of the light source itself as well as by the internal calibration of the white balance and color correction processes. The output of processor 330 is enhanced digital pixel data. The enhanced digital pixel data is then encoded in encoder 335. As an example, encoder 335 may perform a discrete cosine transform (DCT) on the enhanced digital pixel data to produce luminance and chrominance coefficients. These coefficients are forwarded to processor 340. Processor 340 may perform such functions as normalization and/or compression of the received data. The output of processor 340 is then forwarded to either a recording system that records the data on a medium such as an optical disc, RAM or ROM or to a transmission system for broadcast, multicast or unicast over a network such as a cable, telephone or satellite network (not shown).

Processor 345 receives data from memory 350. Memory 350 stores threshold data. This threshold data is compared against another signal or signals generated by the video system 300 to determine if the intensity of the light source 355 needs adjustment. In addition to the ambient light level and the subject's skin tone, the light intensity may need adjustment to compensate for variation in lamp brightness and CMOS/CCD imaging sensor sensitivities, including aging effects, as well as to accommodate subjects that are closer or farther from the camera. Light source 355 may be implemented as the light sources 120b, 220b or 720b shown in FIGS. 1, 2 and 7, respectively.

Processor 345 receives one or more inputs from sources in video system 300. These sources include the output of A/D converter 325, processor 330, encoder 335 and processor 340. These exemplary inputs to processor 345 are shown in FIG. 3 as dashed lines because any one or more of these connections may be made depending on the choices made by a manufacturer in designing and building a video system. These signals may also form part of the automatic gain control (AGC) of the video system 300 (not shown).

As described earlier, A/D converter 325 converts the analog pixel data received from image pick-up device 320 to digitized pixel data. The output of A/D converter 325 may be, for example, one eight-bit word for each pixel. Processor 345 can compare the magnitude of these eight-bit words to threshold data from memory 350 to determine the brightness of the images being captured. If the images are not bright enough, the eight-bit words output from A/D converter 325 will have small values and processor 345 will issue a control signal to light source 355 instructing it to increase the intensity of the light light source 355 emits. Similarly, if the images are too bright, the eight bit words output from A/D converter 325 will have large values and processor 345 will issue a different control signal to light source 355 instructing it to decrease the intensity of the light emitted by light source 355.

Processor 330 may derive the brightness (luminance) and color (chrominance) values from the words received from A/D converter 325. The luminance values generated by processor 330 may be transmitted to processor 345 where they are compared to threshold data received from memory 350.

Encoder 335 generates a signal in the frequency domain from the data received from processor 330. More specifically, encoder 335 generates transform coefficients for both the luminance and chrominance values received from processor 330. Processor 350 may receive the luminance coefficients and compare those values to the threshold data received from memory 350.

Processor 340 may normalize and compress the signals received from encoder 335. This normalized and compressed data may be transmitted to processor 345 where it is denormalized and decompressed. The subsequent data is then compared against the threshold data stored in memory 350.

Processor 345 may also receive signals from light sensor 360. Light sensor 360 measures the ambient light in the area and sends a data signal representative of that measurement to processor 345. Processor 345 compares this signal against threshold data received from memory 350 and adjusts the brightness of the light emitted by light source 360 accordingly. If the ambient light is low, processor 345 will determine this from its comparison using threshold data from memory 350 and issue a control signal to light source 360 to increase the amount of light light source 360 emits. Alternatively, if the ambient light is high, processor 345 will determine this from its comparison using threshold data from memory 350 and issue a control signal to light source 360 to decrease the amount of light light source 360 emits.

Processor 345 may also receive a signal from manual brightness control switch 365. Manual switch 365 is mounted on the external housing of video system 300. As an example, manual switch 365 may be embodied in switch 125 on video telephone 100 shown in FIG. 1, switch 225 on video telephone 200 shown in FIG. 2 or switch 725 on video telephone 700 shown in FIG. 7. The user of a video telephone that incorporates video system 300 may then adjust manual switch 365 to change the intensity of the light from light source 355. In one exemplary system, the turning of manual switch 365 causes processor 345 to retrieve different threshold data from memory 350. Thus the results of the comparison performed by processor 345 using data from A/D converter 325, processor 330, encoder 335 or processor 340 change by using different threshold data from memory 350.

In one illustrative system, manual switch 365 is a dial connected to a potentiometer or rheostat by which the resistance is changed when the dial is turned. The change in resistance is then interpreted by processor 345. Processor 345 then sends a different instruction to light source 355 instructing it increase or decrease the amount of light it emits. Alternatively, manual switch 365 is directly coupled to light source 355 and controls the intensity of the light emitted from light source 355 (i.e., like a dimmer switch in a dining room). It should be understood that both light sensor 360 and manual switch 365 either include integrated A/D converters or A/D converters must be inserted between light sensor 360 and processor 345 and manual switch 365 and processor 345. Alternatively, processor 345 may also include integrated A/D converters for the signals received from light sensor 360 and manual switch 365.

Video system 300 also includes a clock circuit 370. Clock circuit 370 issues one or more clock signals to control the timing of the various circuit elements shown in FIG. 3. For example, clock circuit 370 issues clock signals to image pick-up device 320 and processor 345. It is understood that additional clock signals are transmitted to the other elements of video processing system 300 as needed (not shown).

Figure 4:
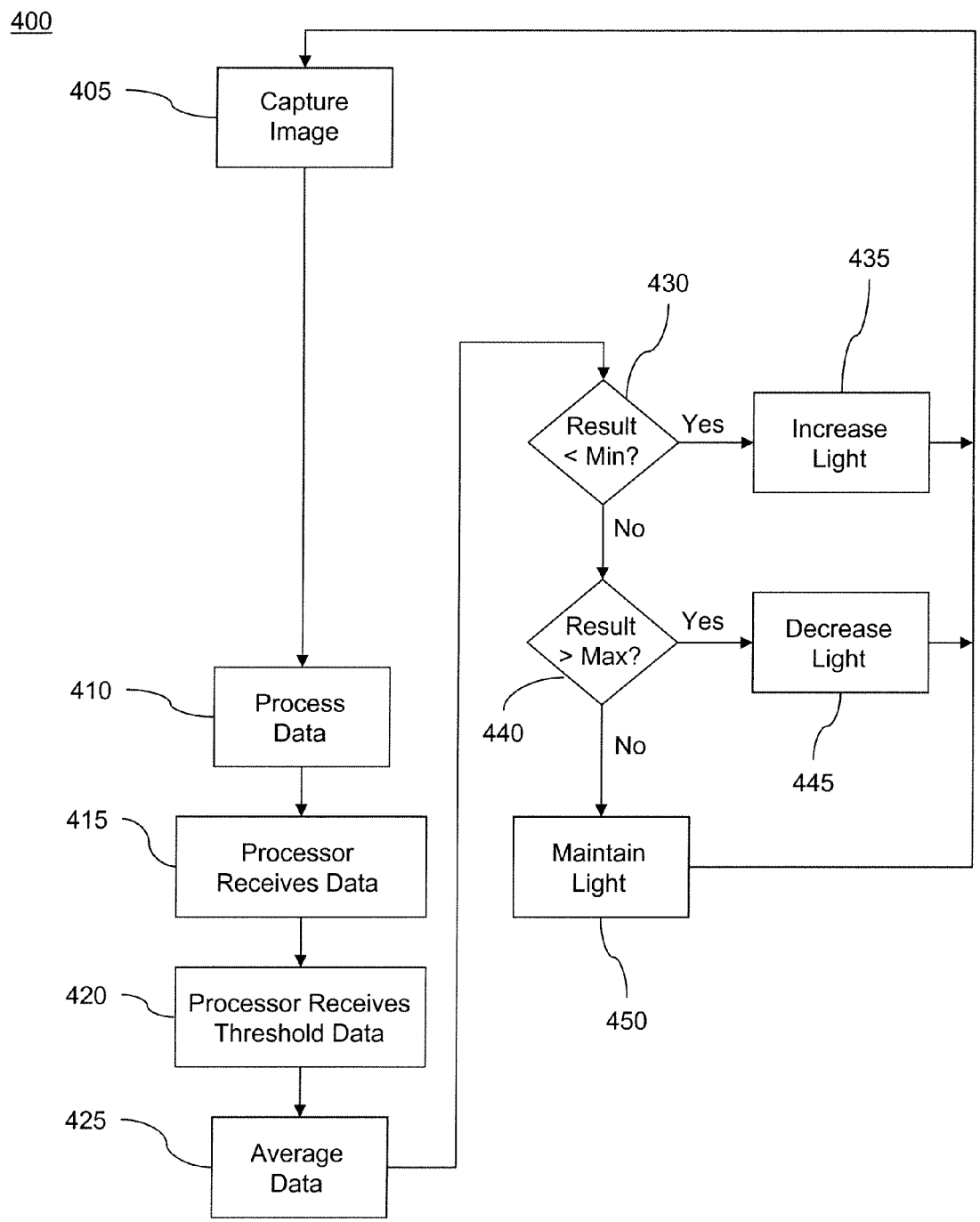
FIG. 4 is a flowchart of a process for adjusting the lighting of a video telephone.

FIG. 4 is a flow chart 400 showing the operation of a video system such as the one shown in FIG. 3. At step 405 an image is captured in an image pick-up device such as a CCD or CMOS image sensor. At step 410 the image data captured by image pick-up device 320 is processed to form representative data of the image. Depending on the construction of the video system, this processing could use any combination of A/D converter 325, processor 330, encoder 335 and processor 340.

At step 415, processor 345 receives representative data of the image data captured by image pick-up device 320. In addition, processor 345 may also receive data from light sensor 360 and/or manual switch 365. At step 420, processor 345 retrieves threshold data from memory 350.

At step 425, processor 345 averages the representative data from a single frame. This averaging compensates for intentional light or dark spots in the image. An example of this is if the image being captured is of a person wearing a black shirt. The pixels associated with the black shirt will have low luminance values associated with it. However the existence of several low luminance values is not an indication of a low-light condition requiring a change in the output from light source 355. By averaging many pixel luminance values, or equivalent data, across the entire frame, or across multiple frames, intended dark spots can be compensated for by lighter spots such as a white wall directly behind the person being imaged. Similarly, the existence of several high luminance values, or their equivalents, of an image of a person wearing a white shirt would not indicate a high-light condition requiring a change in the output from light source 355.

After the processor 345 has determined a composite luminance value for the frame, it compares that value to a minimum threshold data retrieved from memory 350 at step 430. If the composite luminance value is below a minimum threshold value, processor 345 issues a control signal at step 435 instructing light source 355 to emit more light. The process then proceeds to capture another image at step 405.

If at step 430 the composite luminance values are above or equal to the minimum threshold data, processor 345 compares the composite luminance values to a maximum threshold data at step 440. If the composite luminance value is above this maximum threshold value, processor 345 issues a control signal at step 445 instructing light source 355 to decrease the amount of light it emits. The process then continues at step 405 where the next image is captured.

If the composite luminance values are equal to or between the minimum and maximum threshold values, the amount of light output by light source 355 is maintained at its current level at step 450. The process then continues at step 605 where the next image is captured.

Figure 5:
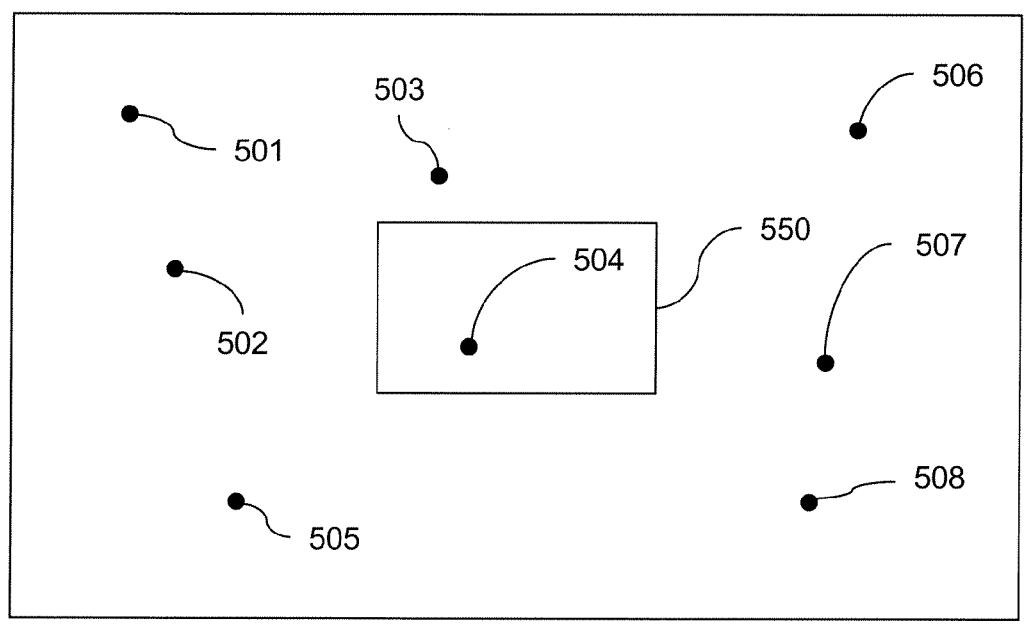
FIG. 5 is an example of samples of pixels from an image.

FIG. 5 shows a frame 500. From frame 500, two subsets of pixel data are shown. In the example shown in FIG. 5, a subset of pixel data is selected at random from across the entire frame 501-508. The luminance values of these pixels 501-508 are averaged by processor 345 in step 425 of FIG. 4. It should be noted that other exemplary systems may use a different number of pixel data such as 16, 32, 64 etc. As described previously, this averaging compensates for desired differences in the frame such as black shirts and white walls.

The second subset is shown as rectangle 550 in frame 500. Every luminance value for every pixel within rectangle 550 is averaged in step 425 in FIG. 4. It should be noted that other exemplary systems may use different shapes (e.g., circle, square, triangle, etc) and may use two or more subsets of pixel data defined by shapes. In addition, the shapes used to define the subset do not necessarily have to be centered in the frame as shown in FIG. 5.

In yet a third exemplary system, the video system may use all of the luminance values from all of the pixels in the frame to generate the average calculated in step 425 of FIG. 4. Of course other forms of "metering" could be used such as spot averaging, center-weight averaging and multi-zone averaging. The apparatus could also be modified to include a face detection algorithm. This algorithm is used to detect where the face of the person is within the entire frame of video information. The device could then focus on those pixels that define the face and average only those pixels to produce a properly lit face pattern on the image pick-up device.

Figure 6:
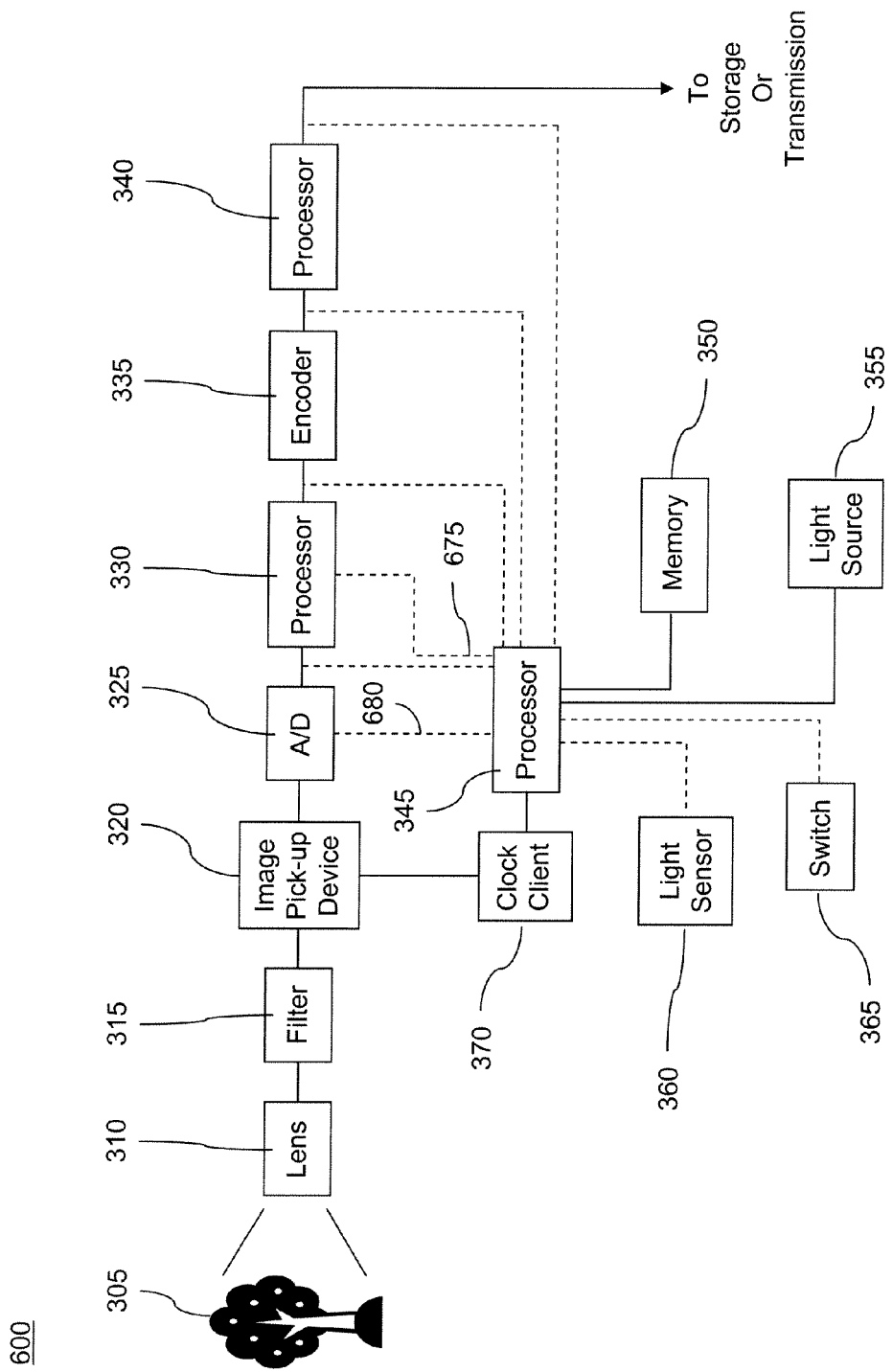
FIG. 6 is a block diagram of functional elements of another video telephone.

FIG. 6 shows another video capture system 600 that may be used in video telephone 100 or 200. This system is similar to video system 300 shown in FIG. 3 so a detailed explanation of every element in FIG. 6 will not be provided. Also, reference numbers used in FIG. 6 designate similar structures in FIG. 3.

Video system 600 differs from video system 300 in that video system 600 has optional control signals output from processor 345 to A/D converter 325 and processor 330. These are gain adjustment signals. These gain signals may be necessary if processor 345 instructs light source 355 to increase its output of light to a point where other aspects of the image quality are jeopardized. The image of the user may appear "washed-out."

When this occurs, processor 345 issues control signals 675 and 680 to decrease the gain in either A/D converter 325 or processor 330. Decreasing the gain in either of these devices will assist video system 600 in compensating for high-light conditions. In another implementation, the control signals 675 and 680 may be used to increase the gain of video processing system 300 after processor 345 has obtained the maximum amount of light from light source 355.

Similarly, if processor 345 instructs light source 355 to decrease the amount of light it outputs, it can also increase the gain of the system via control signals issued to A/D converter 325 or processor 330 on lines 680 and 675. In another implementation, the control signals 675 and 680 may be sued to decrease the gain of video processing system 300 after processor 345 has obtained the least amount of light it can from light source 355. Regardless of the mechanism, video processing system 600 can balance the amount of light output by light source 355 with the automatic gain control of the system to provide an optimum image quality.

While the above description generally relates to changing the level of light emitted from light source 355 to improve the quality of the user's image, light source 355 may also be used as an incoming call indicator or ringer. If video telephone 100 or 200 is not current use, it can receive an incoming video telephone call. This incoming call is detected by processor 345 or alternatively processor 345 is informed of an incoming call by another circuit (not shown). In response to the incoming call, processor 345 issues a signal to light source 355 to light-up. This signal may be a constant, steady-state signal that causes light source 355 to remain on. Alternatively, the signal may oscillate causing light source 355 to turn on and off rapidly. In either case, light source 355 indicates to the user that an incoming video telephone call is available for pick-up.

In addition to providing a light signal to indicate an incoming call, light source 355 may also be used as a decorative design. In such an implementation, light source 355 will be on even when the video telephone is not in use. This may provide light for reading such as when the video telephone is placed on a desk or as a nightlight. In addition, the color of the light may also change when the video telephone is not in use. In such an implementation light source may provide a green, or other color, for background or mood lighting. Manual switch 125 may be used to select different colors of light. In this way the user may have light source 355 emit a green or red light during the Christmas season. Finally, light source 355 may also flash or change colors automatically under the control of processor 345 to provide background lighting, such as a night light function, when the video telephone is not in use in a calling operation.

In yet other alternative systems, a different characteristic of the light emitted from light source 355 is adjusted. In this alternative system, the color of the light emitted from light sources 120*b*, 220*b* and 720*b* may also be altered by processor 345. In addition to, or instead of, measuring the luminance values of representative data output from image pick-up device 320, video processing systems 300 and 600 may compare the chrominance values from the representative data to threshold values stored in memory 350. If a certain chrominance value is above or below a threshold, processor 345 issues a control signal to light source 355 causing it to output a different shade of color. As an example, if the captured images have a green tint to them, processor 345 will detect this tint and issue a control signal to light source 355 to output more red and blue light or reduce the amount of green light output by light source 355. The process shown in FIG. 4 can be followed for this type of adjustment.

The above systems and methods may have different structures and processes. For example, processors 330, 340 and 345 may be general purpose processors. These general purpose processors may then perform specific functions by following specific instructions downloaded into these processors. Alternatively, these processors may be specific processors in which the instructions are either hardwired or stored in firmware coupled to the processors. It should also be understood that these processors may have access to storage such as memory 350 or other storage devices or computer-readable media for storing instructions, data or both to assist in their operations. These instructions will cause these processors to operate in a manner substantially similar to the flow chart shown in FIG. 4. It should also be understood that these elements, as well as the A/D converter 320 may receive additional clock signals not described herewith.

Light sources 120*b* and 220*b* may incorporate any light emitting device. One illustrative light source includes one or more light-emitting diodes (LEDs). These discrete LEDs may be packed close enough together to form either light source 120*b* or 220*b*. That is, the end user may perceive the LEDs to be a single continuous light source, as shown in FIG. 1, or as two or more individual light sources, as shown in FIG. 2.

Color balancing will most often be obtained by choosing the correct type of light to implement as light source 120*b*, 220*b* or 720*b*. Typically incandescent lights may be used to provide a "warm" feeling to the face or object being imaged. This variation of a video system is determined at the time of manufacture and cannot be altered during its use.

In other illustrative systems, multi-colored lights are used for lights source 120*b*, 220*b* or 720*b*. The color output by these multi-colored lights can be adjusted as previously described with respect to intensity to provide more color balancing in the captured images. That is processor 345 will output a control signal to light source 355 instructing it to output more red and blue light and/or reducing its output of green light to prevent the captured image from having a greenish tint to it.

The multi-colored light source may also be used to provide unique ring identifiers when implemented in a video telephone. When the video telephone receives an incoming call it will also receive the calling party's phone number. This is sometimes called caller-ID data or automatic number identification (ANI) data. Memory 350 stores a database of different light shades associated with a plurality of calling phone numbers as established by the user. Processor 345 receives the caller-ID data and queries memory 350. Memory 350 responds with a control word that is used to control the shade or color of light output by light source 355. As an example, light source 355 may flash green when a user's brother calls and blue when the user's sister calls. Taking this a step further, the light may also flash on and off either in a regular pattern or it may flash on and off in synchronicity to a song much like a light organ does.

In alternative video telephones light source 120*b* may include a single incandescent or fluorescent bulb shaped to fit into housing assembly 120. Housing assembly 120 would include a socket for light source 120*b* to be plugged into. Similarly, light source 220*b* may include two incandescent or fluorescent bulbs shaped to fit into housing assembly 220 with corresponding sockets.

Figure 7:
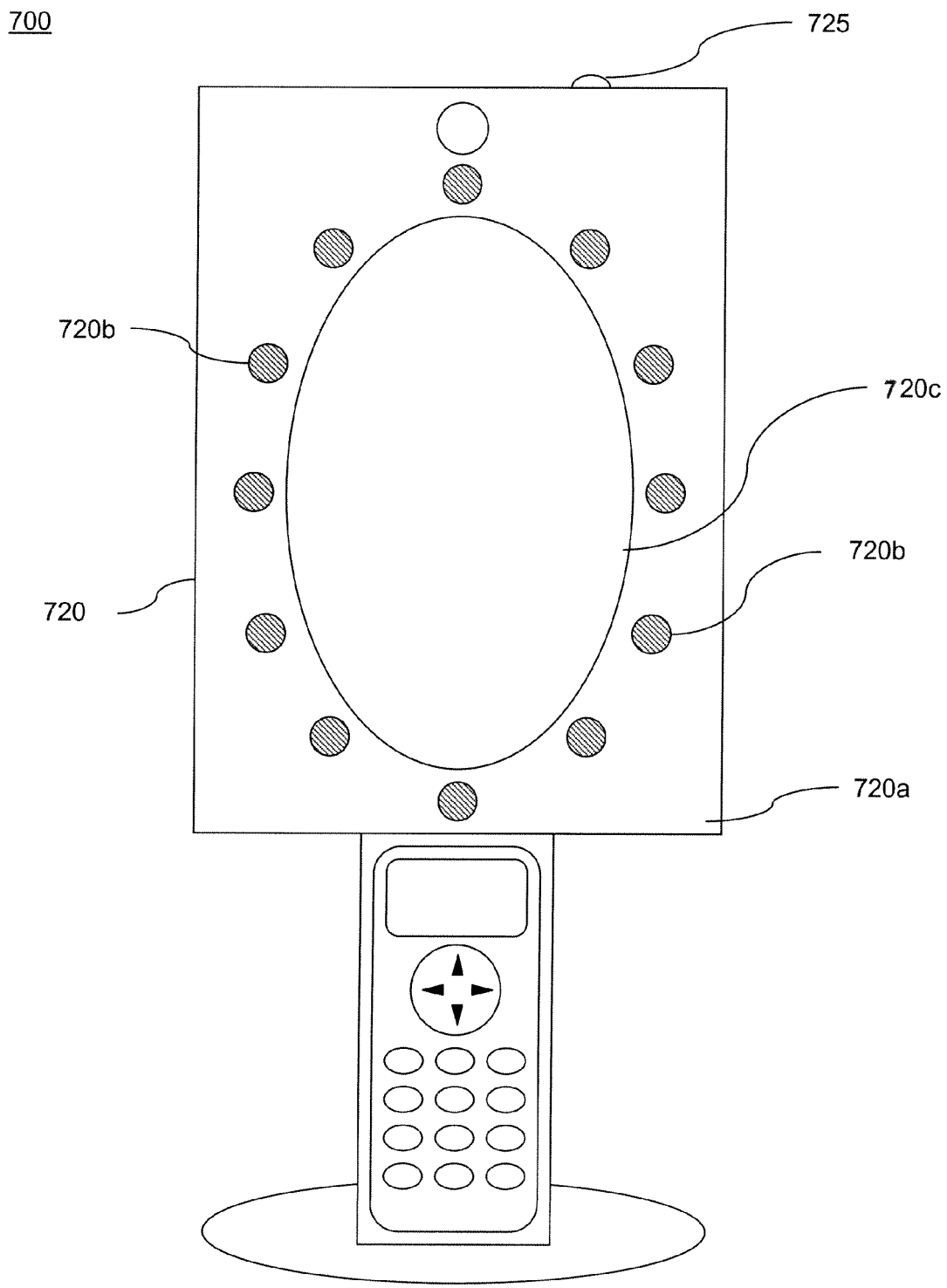
FIG. 7 is a video telephone with an alternative light source.

Other variations of light sources are possible than those shown in FIGS. 1 and 2. For example, as shown in FIG. 7, smaller discrete light sources 720*b* may be dispersed around the screen 720*c* like the numbers on the face of a clock in housing assembly 720*a*. As shown in FIG. 7, these smaller, discrete light sources 720*b* may be placed at approximately 30 degrees to each other around screen 720*c*. Fewer or more discrete light sources 720*b* may be employed depending on the design specification and manufacturing requirements without departing from the scope of this invention.

Another variation for the systems shown in FIGS. 3 and 6 is the integration of various components into one component. For example, in FIGS. 3 and 6, processor 330, encoder 335, processor 340 and processor 345 may all be incorporated into one general purpose processor or ASIC. Similarly, the individual steps shown in FIG. 4 may be incorporated together into fewer steps or further divided out into sub-steps or some steps may be omitted. Finally, the organization of FIGS. 3 and 6 as well the order of the steps of FIG. 4 may be altered by one of ordinary skill in the art.

In yet other alternative systems, light sources 120*b*, 220*b* and 720*b* may be shielded from the camera and display by other methods than recessing the lights into their respective housings. For example, a lens shield could be placed over or around the camera. Alternatively, the housing could include a raised section like a frame around display 120*c*, 220*c* or 720*c* to adequately shield the display from the light source.

While the systems and methods have been described with reference to video telephones, it should be understood that the systems and methods may also be applied to other video processing systems. Examples include video camera, Web cameras and digital still cameras.

The process shown in FIG. 4 may be implemented in a general, multi-purpose or single purpose processor. Such a processor will execute instructions, either at the assembly, compiled or machine-level, to perform that process. Those instructions can be written by one of ordinary skill in the art following the description of FIG. 4 and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

The invention claimed is:

1. A video telephone with a camera coupled in a housing that is operable to capture an image, a screen coupled to the housing that displays an image, and a light source for lighting up an image, the light source coupled to the housing adjacent to the screen, the video telephone comprising:
    a processor operable to determine chrominance values of the image from the camera; and
    a memory coupled to the processor, the memory operable to storing chrominance thresholds for the chrominance values, wherein
    the processor operates the light source to indicate an incoming call to the video telephone, and the processor is operable to adjust the light source such that the chrominance values fall between minimum and maximum chrominance thresholds.

2. The video telephone of claim 1 wherein the chrominance values are averaged across a portion of the image.

3. The video telephone of claim 2 wherein the portion of the image defines a face determined from a face detection algorithm in the processor.

4. The video telephone of claim 1 wherein particular color shades of the light source are associated with particular callers, and a color shade of the light source is turned on just before the video telephone is used in receiving an incoming call from a caller associated with that color shade.

5. The video telephone of claim 1 wherein the processor is operable to direct the light source to output a particular color shade when the video telephone is not being used for a call, and wherein the processor directs the camera to take images such that, if a certain chrominance value falls outside of the maximum or minimum threshold, the processor issues a control signal to light source causing it to output a different shade of color.

6. A method of operating a video telephone comprising the steps of:

capturing an image by collecting data representative of the image;

generating chrominance data from the image data;

comparing the chrominance data to a threshold for the chrominance values so as to produce a resultant data;

operating a light source to indicate an incoming call to the video telephone; and adjusting a chrominance of light output from the light source such that the resultant data falls between minimum and maximum chrominance thresholds.

* * * * *